United States Patent [19]

Brown et al.

[11] Patent Number: 4,508,586
[45] Date of Patent: Apr. 2, 1985

[54] TIRE BEAD TURN-UP DEVICE

[75] Inventors: Robert L. Brown, Akron; William A. Jones, Mogadore; Daryl E. Anderson, Akron, all of Ohio

[73] Assignee: GenCorp Inc., Akron, Ohio

[21] Appl. No.: 530,799

[22] Filed: Sep. 9, 1983

[51] Int. Cl.$^3$ ............................................. B29H 17/22
[52] U.S. Cl. .................... 156/401; 156/414; 156/416; 156/421.4; 156/132
[58] Field of Search ............... 156/401, 398, 399, 400, 156/416, 421.4, 414–415, 417–420, 132

[56] References Cited

U.S. PATENT DOCUMENTS

| | | | |
|---|---|---|---|
| 3,692,605 | 9/1972 | Cantarutti | 156/401 |
| 3,833,445 | 9/1974 | Mallory et al. | 156/401 |
| 4,007,081 | 2/1977 | Mallory | 156/417 |
| 4,087,306 | 5/1978 | Head et al. | 156/401 |
| 4,226,656 | 10/1980 | Appleby et al. | 156/416 |
| 4,243,451 | 1/1981 | Kortman | 156/401 |
| 4,416,720 | 11/1983 | Baldoni | 156/401 |

Primary Examiner—Lois E. Boland

[57] ABSTRACT

A tire building drum is described as having, a plurality of radially movable bead lock segments at each end of the drum for holding the tire bead rings during the turn-up operation, a pair of turn-up bladders, and a pair of carriers which work in conjunction with the bead lock segments and turn-up bladders to tension the ply endings of the unvulcanized carcass ply or plies as the ply endings are turned up and reversely wrapped around the tire bead rings to anchor the rings to the unvulcanized tire carcass for further processing.

The carriers span the bead seats of the bead lock segments and snugly fit around the adjacent turn-up bladders, so that the bead lock segments, upon radial expansion, pull against and distort the shape of the bladders which react to regain their shape and/or position by pushing back against the carriers to tension the carriers which are in contact with the ply endings and which tension the ply endings during turn-up to eliminate, adjacent the tire bead rings, the formation of voids which entrap air and adversely affect the adhesion between the tire bead rings and surrounding rubber material. A lubricant is provided between the contacting surfaces of the carriers and turn-up bladders to permit relative, unimpeded movement between these two components.

9 Claims, 3 Drawing Figures

TIRE BEAD TURN-UP DEVICE

BACKGROUND OF THE INVENTION

The invention relates broadly to tire building machinery, and specifically to a device that is used in connection with a tire building drum to turn-up the ply endings, of an unvulcanized tire carcass, around the tire beads to anchor the beads firmly to the tire carcass of a truck, passenger, or off-the-road tire.

An unvulcanized tire carcass is built by an operator who layers on a rotary tire building drum, one or more plies of tire cord fabric that has been calendered with unvulcanized rubber material. The unvulcanized tire carcass is then secured between a pair of parallel tire beads which are, normally, inextensible wire rings that are used to mount the finished, vulcanized tire on a wheel rim. The securement of the two bead rings to the unvulcanized tire carcass is made by first positioning the bead rings around the tire carcass inwardly of the opposing ends of the tire carcass, so that the endings of the carcass ply or plies extend outwardly beyond the bead rings. These ply endings are then turned up and reversely wrapped around the bead rings and pressed or stitched against the carcass ply or plies to firmly lock the bead rings to the unvulcanized tire carcass. The turn-up of the ply endings is accomplished by the use of a pair of annularly shaped rubber bladders which are positioned adjacent opposing ends of the drum and which are inflated with air to expand and engage the ply endings and roll them over the bead rings into compressive engagement with the portions of the tire carcass immediately inwardly of the bead rings. This turn-up process, carried out primarily by the turn-up bladders, is critical to the building of a good tire, and care must be taken to avoid the formation of voids during the process, since voids trap within the structure of the tire, air which adversely affects the adhesion between the bead rings and surrounding rubber material. This condition causes the beads to separate from the surrounding rubber material during operation of the tire as it rapidly rotates and bounces along a highway. This damage to a tire cannot be repaired, and a tire, so damaged, must be discarded and replaced.

U.S. Pat. No. 4,087,306 describes some of the problems encountered in controlling the inflation and corresponding movement of the turn-up bladders to make a good tight wrapping of the bead rings with the ply endings. The invention of U.S. Pat. No. 4,087,306 mainly concerned with controlling the rollover motion of the turn-up bladders, after the bladders move initially, which initial movement is difficult to predict and control. FIG. 8 of U.S. Pat. No. 4,087,306 shows that the inboard portion of each bladder, i.e. the part of the bladder closest the tire building surface of the drum, expands inside the bead rings closest the longitudinal center axis of the drum. It can be appreciated that, any movement of this inboard portion of the bladder inwardly of the drum, can cause adjacent the insides of the bead rings, a slackening or bunching of the carcass ply or plies which, in turn, can produce voids in these critical areas of the tire. U.S. Pat. No. 4,087,306 also discloses a turn-up bladder which is designed for interlocking engagement with a number of bead lock segments which are movable in radial directions, relative to the center axis of the drum, to grasp and hold the bead rings firmly in position while the ply endings are turned up around the bead rings. Initial movement of these bladders inwardly of the drum could cause similar problems. Thus, the sole use and reliance upon air bladders to effect a good turn-up of the ply endings is doubtful.

U.S. Pat. No. 4,007,081 discloses the use of an elastic drum sleeve for tensioning the carcass ply or plies between the bead lock segments. This is important in making a good, tight wrapping of the bead rings, but even more essential is the tensioning of the ply endings for which this patent apparently relies on the expansion of the turn-up bladders. Thus, in the respect U.S. Pat. No. 4,007,081 is similar in scope of the aforementioned U.S. Pat. No. 4,087,306.

The invention of this application is directed to maintaining the ply endings of the carcass ply or plies in tension during the turn-up process, as a means of forming a tight as wrap as possible to eliminate the formation of voids adjacent the bead rings.

Briefly stated, the invention is in a tire building drum that has an outer cylindrical shell, a plurality of radially movable bead lock segments adjacent each of the opposing ends of the shell, and a generally annularly shaped, inflatable turn-up bladder which is disposed outwardly of each group of bead lock segments. A pair of special carriers cover the exposed faces of the bead lock segments and at least partially surround the adjacent turn-up bladder. Each of the carriers is composed of a material which is inextensible in a direction longitudinally of the drum. The carrier has an inboard end which is secured inwardly of the bead lock segments and an outboard end which is secured outwardly of the bead lock segments. Each carrier is of a length to snugly fit the adjacent turn-up bladder, so that, upon radial expansion or movement of the bead lock segments, the material of the carriers will be tensioned to distort the shape of the turn-up bladders which will react to this imposition by the carriers to maintain constant tension on the carriers which, in turn, tension the ply endings, especially during the initial stages of the turn-up process.

In certain designs of the bead lock segments, the carcass ply or plies between the bead lock segments will also be stretched and tensioned upon radial expansion or movement of the bead lock segments.

DESCRIPTION OF THE DRAWING

The following description of the drawing will be better understood by having reference to the accompanying drawing, wherein.

ENVIRONMENT OF THE INVENTION

Figure 1:
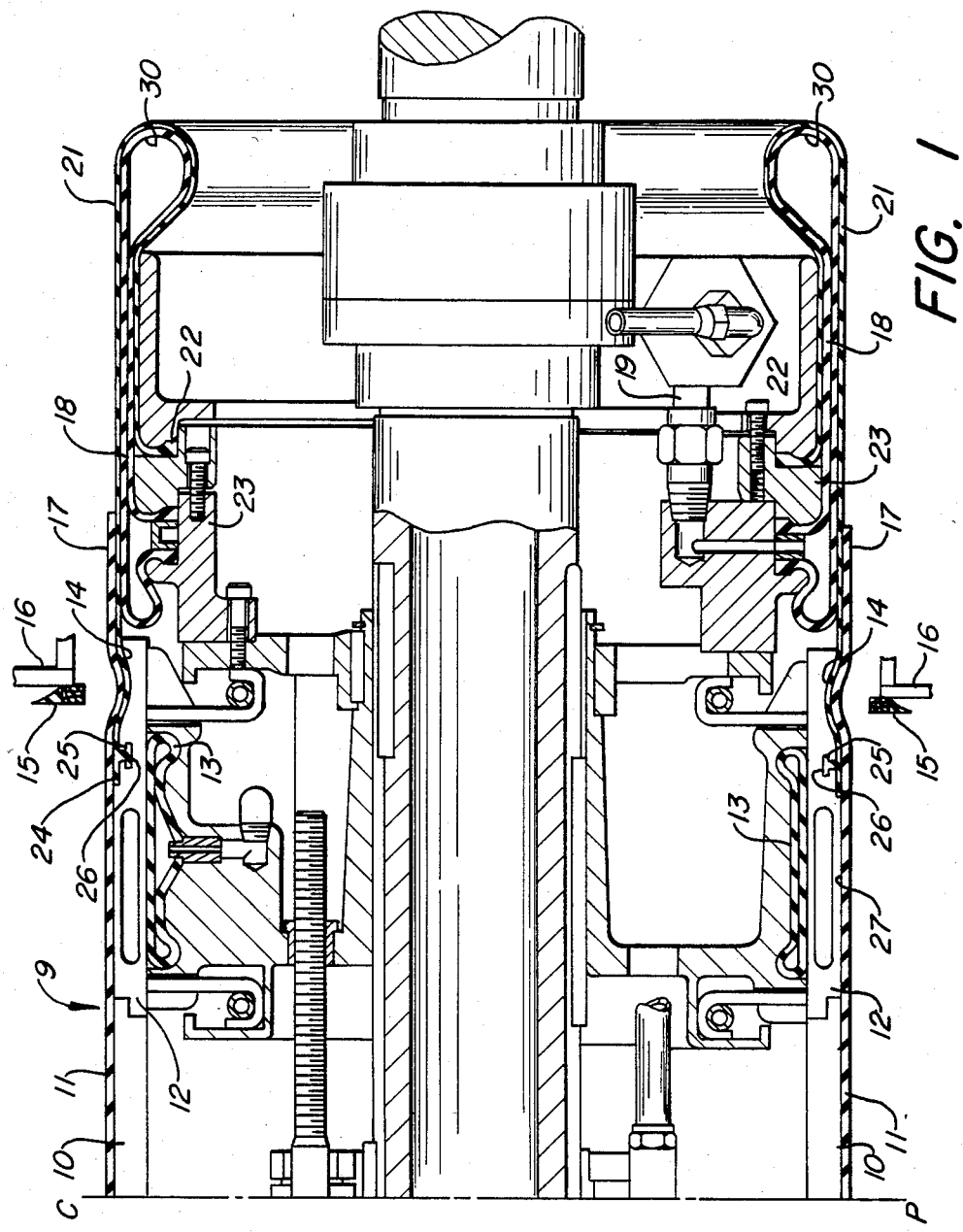
FIG. 1 is a cross-section of one-half of a tire building drum which is made in accordance with the invention, and which is shown in connection with a tire bead ring that is positioned around a single tire carcass ply which is layered on the drum.

With general reference to the drawing for like parts, and particular reference to FIG. 1 there is shown a tire building drum 9 that has an outer, cylindrical shell or surface 10 on which is layered, for example, a single carcass ply 11 that is composed of any suitable tire cord fabric which is calendered with unvulcanized rubber material.

A plurality of similar, bead lock segments 12 are positioned adjacent each of the opposing ends of the drum 9. The bead lock segments 12 at each end of the drum 9, are equally, angularly spaced around the longitudinal center axis A—A of the drum 9. Further, they are equally spaced from the centerplane C-P of the drum 9. The bead lock segments 12 at both ends of the drum 9 are movable, in unison, along fixed radial pathways, relative to the center axis of drum 9, by any suitable means, e.g. an annular, inflatable air bag 13. The bead lock segments 12 each have an inwardly curved depression or seat 14 in which an annular tire bead ring 15 becomes seated when the bead lock segments 12 are radially expanded or moved from their fully retracted positions of FIG. 1 to their fully extended positions of FIG. 2, after the two bead rings 15 are moved into position, as shown in FIG. 1, by any suitable means, e.g. bead setting devices or rings 16. The bead-seats 14 of each group of bead lock segments 12 are circumferentially aligned in the same plane that is normal to the center axis of the drum 9. The two tire bead rings 15 are located inwardly of the ply endings 17 of the carcass ply 11 in radial alignment with the bead seats 14 of the adjacent group of bead lock segments 12.

An annular, inflatable turn-up bladder 18 is disposed adjacent each of the opposing ends of the drum 9 in spaced relation outwardly of the bead lock segments 12. The turn-up bladders 18 are composed of any suitable elastomeric material which can be reinforced with any appropriate reinforcement cords or fabric, if desired. Air is pumped, under pressure, through the distribution mechanism 19 to simultaneously inflate the turn-up bladders 18 to turn-up and rollover the ply endings 17 against the portions 20 of the carcass ply 11 located immediately inwardly of the tire bead rings 15. It can be appreciated that, if the ply endings 11 are short, i.e. they extend only a short distance beyond the tire bead rings 15, the turn-up bladders 18 could prove ineffective in making a good, tight turn-up of the ply endings 17, especially if any slippage occurs between the turn-up bladders 17 and the ply endings 17. Moreover, the important tensioning of the ply endings 17 during turn-up could be defeated, if the initial movement of the turn-up bladders, upon inflation, was inwardly in the direction of the centerplane of the drum 9.

THE INVENTION

To prevent the aforementioned problems, means are provided to tension the ply-endings 17, especially during the initial stages of the turn-up process. Such means include a pair of carriers 21 which are inexpansible in at least a direction longitudinally of the drum 9 and which at least partially surround and cover the turn-up bladders 18. Each of the generally annularly shaped carriers 21, in this instance, is a piece of vulcanized rubber material which is reinforced with inextensible polyester reinforcement cords that are in planes that are radially oriented relative to the center axis of the drum 9; that is, the cords have the same orientation as the radial cords of a radial green tire carcass. When the carriers 21 are in their fully retracted positions on the drum 9, as seen in FIG. 1, the reinforcement cords extend longitudinally of the drum 9. The enlarged, annular outboard end 22 of each carrier 21 farthest from the centerplane of the drum 9, is clamped to the support 23 to which both ends of the adjacent turn-up bladder 18 are secured. The annular, inboard end 24 of each carrier 21, closest the centerplane of the drum 9, is provided with a specially configured annular bulbous portion 25 which is interlockingly engaged in a matingly shaped, arcuate recess 26 that is disposed in the exposed face or surface 27 of each of the bead lock segments 22 inwardly of the adjacent bead seat 14. As can be seen from FIG. 1, the carriers 21 have a length and shape, so that they fit snugly against the turn-up bladders 18, even when the bladders 18 are uninflated. The carriers 21 are positioned between the turn-up bladders 18 and the ply endings 17 and juxtaposed tire bead rings 15.

Figure 2:
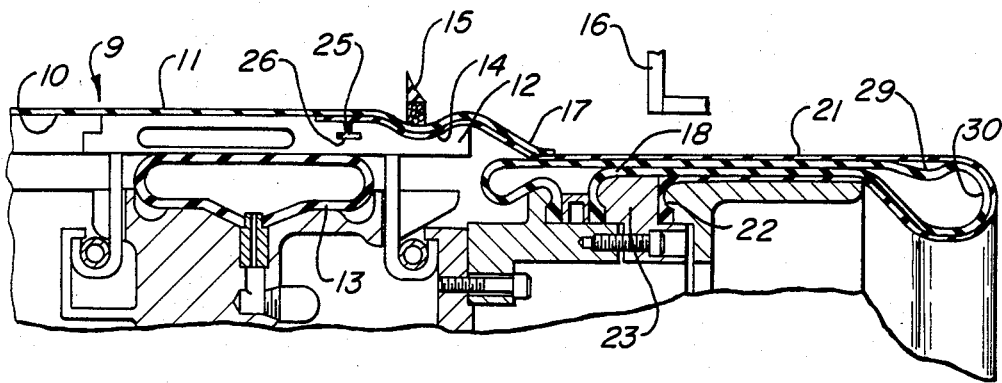
FIGS. 2 and 3 are similar cross-sections of a portion of the drum of FIG. 1, to illustrate the sequential steps in turning up the ply endings around the bead rings.

Assuming the tire bead rings 15 are in position to begin the turn-up process, as seen in FIG. 1, the air bags 13 are inflated to move the bead lock segments 12 and covering carcass ply 11 into compressive holding engagement with the tire bead rings 15, as seen in FIG. 2. Almost simultaneously, the bead setting rings 16 are moved outwardly from the centerplane of the drum 9 out of interfering relation with the inflation and consequent expansion of the turn-up bladders 18.

It can be appreciated from a comparison of FIGS. 1 and 2, that the length of the carriers 21 from the bead seats 14 to the outboard-most portions 30 of the turn-up bladders 18 is increased when the bead lock segments 12 are moved radially to their fully extended positions of FIG. 2. Because the carriers 21 are inextensible, their length between the bead seats 14 and the outboard-most portions 30 is increased by means of their portions under the outboard portions 30 of the bladders 18 sliding around the portions 30. Also, this action causes the carriers 21 to pull the turn-up bladders 18 inwardly towards the centerplane of the drum 9 to distort the shape of the turn-up bladders 18 by at least forming an annular concavity or valley-shaped fold 29 in the binders 18 adjacent the outboard-most portions 30 thereof. In some cases, the pull exerted by the carriers 21 against the turn-up bladders 18, is sufficient to displace the bladders 18 inwardly towards the centerplane of the drum 9. The turn-up bladders 18 react to this imposition of the carriers 21 by attempting to resume their natural shape. This counter pushing action by the turn up bladders 18 causes a tensioning of the carriers 21 which, in turn, tension the ply endings 17 engaged by the carriers 21. Thus, the carriers 21, when activated by radial expansion of the bead lock segments 12, figuratively grab the ply endings 17 and pull them outwardly to tension them during the turn-up process.

It is important for the turn-up bladders 18 to be free to expand and rollover unimpeded by the juxtaposed carriers 21. Therefore, any suitable lubricant, e.g. zinc stearate, is applied to the contacting surfaces of the turn-up bladders 18 and carriers 21 to insure that the turn-up bladders 18 will be free to expand independently of the carriers 21. Otherwise, the carriers 21 could cause an initial shift of the expanding turn-up bladders 18 in the direction of the centerplane of the drum 9 to cause consequent movement of the ply endings 17 conducive to the formation of voids during the turn-up process. The carriers 21 act as intermediary tensioning members of the ply endings 17 no matter what their length might be.

The tensioning of the carriers 21 is naturally dependent on the snugness of the fit between the carriers 21 and the adjacent turn-up bladders 18, as well as the radial extension of the bead lock segments 12 which can be of different designs. For example, the bead lock segments 12 can be much narrower, in width, in which case, the inboard ends 24 of the carriers 21 can be secured in a matingly shaped recess that is formed in the outer cylindrical shell 10 of the drum 9, rather than in the bead lock segments 12.

Figure 3:
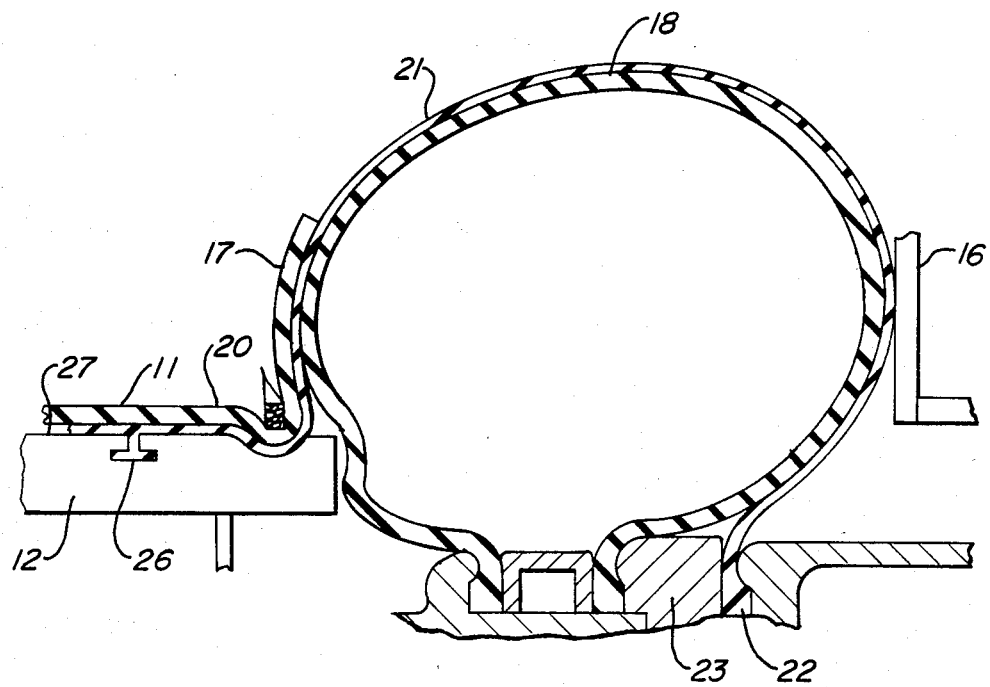

The turn-up is completed as the inflated turn-up bladders 18 and surrounding carriers 21 are engaged by the bead setting rings 16 and pushed inwardly towards the centerplane of the drum 9, as seen in FIG. 3, to cause the bladders and carriers to roll over the adjacent tire bead rings 15 and compress the ply endings 17 firmly against the adjacent portions 20 of the carcass ply 11.

Thus, there has been described a unique carrier that is used in conjunction with each one of the turn-up bladders to tension the ply endings of the carcass ply or plies as the endings are reversely wrapped around the tire bead rings to anchor the tire bead rings firmly in their proper positions on opposing ends or sides of an unvulcanized tire carcass which can be used to build either passenger, truck, or off-the-road tires. Such carriers are easily adapted to most tire building drums to insure a good, tight wrapping of the tire bead rings. No longer is the turn-up process reliant solely on the unpredictable behavior of the turn-up bladders. This simple, but unique invention, provides a positive tensioning device of the ply endings during turn-up to eliminate, or substantially reduce the formation of voids in the area of the tire beads. It should be obvious to those skilled in the art that this invention can be used in conjunction with tire building drums which cylindrically or toroidally shape the carcass plies for receipt of the tire bead rings during the turn-up process.

What is claimed is:

1. A tire building drum, comprising:
   (a) a cylindrical outer shell on which at least one carcass ply of unvulcanized rubber material is layered, the shell having a pair of opposing ends adjacent which lay the opposing ply endings of a carcass ply when layered on the shell which also has a longitudinal center axis and a center plane which divides the shell in half longitudinally;
   (b) a pair of annular, inflatable turn-up bladders adjacent the opposing ends of the shell, the bladders each having a reversely bent inboard end which is at least partially covered by the ply endings and a reversely bent outboard end which is farther from the centerplane of the shell than the inboard end;
   (c) a plurality of bead lock segments adjacent each of the opposing ends of the shell, the segments being simultaneously movable in radial directions from the center axis of the shell and designed to move a tensioning means of the play endings and the adjacent juxtaposed ply endings into compressive engagement with a pair of tire bead rings when said rings are positioned around the shell axially inwardly of the ply endings, each of the bead lock segments including a bead seat which is in radial alignment with the tire bead rings when the rings are in position around the shell, and each of the bead seats being a curved depression which extends inwardly of the segments in the direction of the center axis of the shell;
   (d) a tensioning means interposed between the ply endings and bladders and separate from the bladders, including a separate carrier at each of the opposing ends of the shell, each carrier being a piece of material which is inextensible at least longitudinally of the shell and which has (i) an annular inboard end anchored to the drum axially inwardly of the bead seats, and (ii) an annular outboard end anchored to the drum axially outwardly of the bead seats, the carriers being sized and shaped to cover the adjacent bead seats and snugly fit around the outboard ends of the bladders as well as at least a portion of the outer exposed surfaces of the bladders between the inboard and outboard reversely bent portions thereof.

2. The tire building drum of claim 1, wherein the material of each carrier includes inextensible cords for reinforcing the material, the cords extending longitudinally relative to the center axis of the shell when the adjacent bladders are uninflated.

3. The tire building drum of claim 2, which includes means for lubricating the contacting surface of the carriers and bladders, so that the bladders are free to move independently of the carriers.

4. The tire building drum of claim 3, wherein the inboard ends of the carriers each include a specially shaped bulbous portions, and the bead lock segments each have a matingly shaped recess for interlockingly receiving an adjacent bulbous portion.

5. The tire building drum of claim 3, wherein the inboard ends of the carriers each include a specially shaped bulbous portion, and the shell adjacent the bead lock segments includes a pair of matingly shaped recesses for interlockingly receiving the bulbous portions.

6. The tire building drum of claim 3, wherein the material of each carrier includes vulcanized rubber material.

7. A tire building drum, comprising:
   (a) a cylindrical outer shell on which at least one carcass ply of unvulcanized rubber material is layered, the shell having a pair of opposing ends adjacent which lay the juxtaposed opposing ply endings of a carcass ply when layered on the shell which also has a longitudinal center axis and a centerplane which divides the shell in half longitudinally;
   (b) a pair of annular, inflatable turn-up bladders adjacent the opposing ends of the shell, the bladders each having (i) a reversely bent inboard end which is at least partially covered by the ply endings, (ii) a reversely bent outboard end farther from the centerplane of the shell than the inboard end, and (iii) a generally cylindrical outer exposed surface between the inboard and outboard ends;
   (c) a plurality of bed lock segments adjacent each of the opposing ends of the shell, the segments each having an outer exposed curved surface in which is disposed a bead seat which is curved inwardly of the segment, the bead seats of the segments adjacent each of the opposing ends of the shell being in circumferential alignment, the segments being radially movable, in unison, from retracted positions closer the center axis of the drum, to extended positions farther from the center axis where the bead seats are spaced radially outwardly from the center axis a distance greater than the cylindrical outer surfaces of the bladders when the bladders are uninflated;
   (d) a carrier disposed adjacent each of the opposing ends of the shell, the carriers each including a piece of material which covers the bead seats and fits snugly around the cylindrical outer surfaces and outboard ends of the bladders, the carriers each having an annular axially inboard end anchored to the drum axially inwardly of the bead seats and an annular axially outboard end anchored to the drum axially inwardly from the axially outward-most portion of the adjacent bladder, each of the pieces of material including a plurality of inextensible cords which extend longitudinally relative to the center axis of the shell when the bladders are uninflated; and (e) means for lubricating the contacting surfaces of the carriers and bladders, so that the bladders are free to expand and move independently of, and without hindrance from, the carriers.

8. The tire building drum of claim 7, wherein the inboard ends of the carriers each includes a bulbous portion, and the exposed outer surfaces of the bead lock segments each includes a matingly shaped recess in which the bulbous portions are interlockingly received.

9. The tire building drum of claim 8, which includes means for positioning a pair of tire bead rings in parallel relation around the shell in aligned, radial spaced relation from the bead seats, when the segments are in their retracted positions.

* * * * *